US 6,679,402 B1

(12) United States Patent
D'Alayer De Costemore D'Arc

(10) Patent No.: US 6,679,402 B1
(45) Date of Patent: Jan. 20, 2004

(54) FOOD PRODUCT CARTRIDGE

(75) Inventor: Stéphane Marie Andre D'Alayer De Costemore D'Arc, Genappe (BE)

(73) Assignee: Fountain Industries Europe S.A., Braine-l'Alleud (BE)

( * ) Notice: Subject to any disclaimer, the term of this patent is extended or adjusted under 35 U.S.C. 154(b) by 78 days.

(21) Appl. No.: 10/018,810
(22) PCT Filed: Jun. 20, 2000
(86) PCT No.: PCT/BE00/00067
§ 371 (c)(1), (2), (4) Date: Jan. 18, 2002
(87) PCT Pub. No.: WO00/78188
PCT Pub. Date: Dec. 28, 2000

(30) Foreign Application Priority Data

Jun. 23, 1999 (BE) .............................. 9900440

(51) Int. Cl.⁷ .............................. G01F 11/20
(52) U.S. Cl. ................ 222/413; 222/185.1; 222/424.5; 222/504
(58) Field of Search ................ 222/410, 412, 222/413, 167, 424.5, 185.1, 469, 333, 504

(56) References Cited

U.S. PATENT DOCUMENTS

| 630,659 A | * | 8/1899 | Clayton ............... 222/36 |
| 991,183 A | * | 5/1911 | Thors ................. 198/530 |
| 1,477,434 A | | 12/1923 | Enright |
| 1,529,379 A | * | 3/1925 | Thompson ............ 222/413 |
| 1,548,558 A | * | 8/1925 | Shutterly ............ 222/231 |
| 2,907,500 A | * | 10/1959 | Kerkvliet ............ 222/311 |
| 3,033,249 A | * | 5/1962 | Tamm ................. 141/369 |
| 3,057,522 A | * | 10/1962 | Reed ................. 222/285 |
| 3,648,904 A | * | 3/1972 | Teige ................ 222/380 |
| 4,136,803 A | * | 1/1979 | Tobias et al. ......... 222/413 |
| 4,313,674 A | * | 2/1982 | Ura et al. ............ 399/360 |
| 4,802,609 A | | 2/1989 | Morse et al. |
| 5,110,015 A | * | 5/1992 | Kilts ................. 222/413 |
| 5,333,762 A | * | 8/1994 | Andrews .............. 222/238 |
| 5,669,531 A | * | 9/1997 | Hagemeyer ........ 222/153.14 |
| 5,715,976 A | * | 2/1998 | Kautz ................ 222/413 |
| 5,826,754 A | * | 10/1998 | Ishaya et al. ........ 222/185.1 |

FOREIGN PATENT DOCUMENTS

| GB | 2 202 211 | 9/1988 |
| GB | 2 218 410 | 11/1989 |

OTHER PUBLICATIONS

Abstracts of Japan No. 09 253476, Ryobi Ltd., Powder Feeding Apparatus, Sep. 30, 1997.
Abstracts of Japan No. 07 080043, Tokyo Shokai:KK, Powder Supplying Machine, Mar. 28, 1995.

* cited by examiner

Primary Examiner—Gene Mancene
Assistant Examiner—Frederick C. Nicolas
(74) Attorney, Agent, or Firm—Dykema Gossett PLLC

(57) ABSTRACT

A food product cartridge comprising a delivery and dosage member, said cartridge having a base part wherein an endless screw and a delivery opening are housed, characterized in that the endless screw is provided to operate a shutter for opening and closing the delivery opening.

7 Claims, 2 Drawing Sheets

Figure 1:
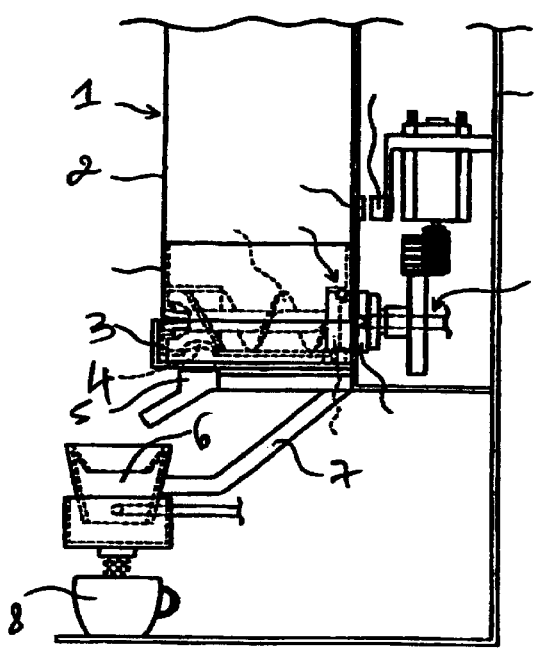

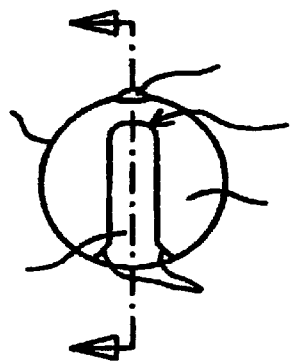
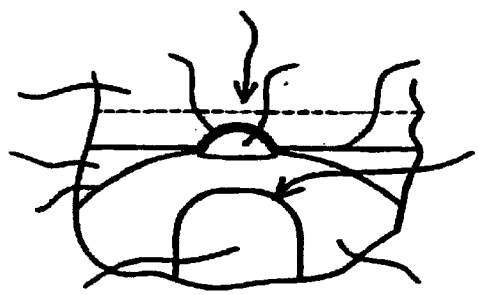
Fig. 5　　　　　Fig. 6
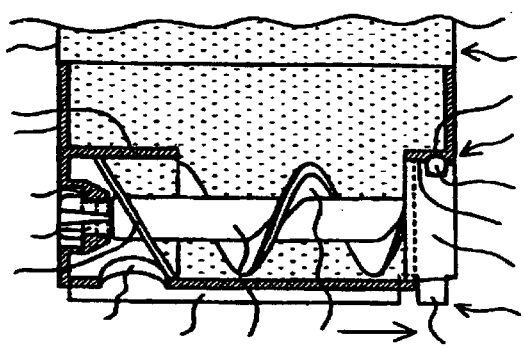
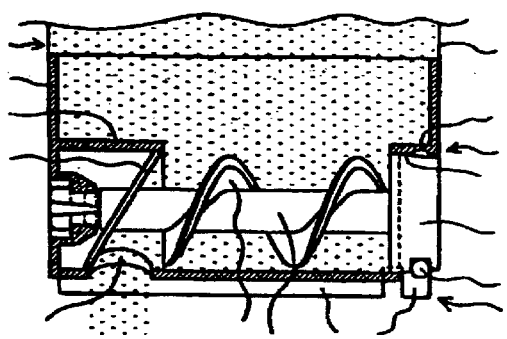
Fig. 7　　　　　Fig. 8

FOOD PRODUCT CARTRIDGE

The invention relates to a food product cartridge comprising a delivery and dosage member, the cartridge having a base part wherein an endless screw and a delivery opening are housed.

Such cartridge is known from U.S. Pat. No. 4,802,609 which describes a cartridge-shaped housing having a dispenser with an endless screw in its bottom part. A measuring cup, attached outside the housing, closes the output of the housing in which the extremity of the endless screw is located.

A dispensing tray is pivotally mounted on the measuring cup. The endless screw can be manually turned to convey a quantity of food product into the measuring cup.

A drawback of the known cartridge is that the endless screw operates only as a conveyor. The obturation of the cartridge is realized by the dispensing tray. This obturation is however not tight enough to prevent moisture from entering the cartridge and deteriorating the food product. Furthermore, loss of food product could occur.

Moreover, for the user, it is necessary to execute two operations to obtain the delivery of the food product. First, he has to turn a handle in order to convey the food product with the endless screw to the measuring cup and then to push a hand lever in order to turn the dispensing tray around and thus have the food product delivered.

An object of the present invention is to avoid these shortcomings. This is achieved according to the present invention by a food product cartridge comprising a delivery and dosage member, the cartridge having base part wherein an endless screw and a delivery opening are housed, the endless screw being provided to operate a shutter for opening and closing the delivery opening.

The endless screw thus operates not only as a conveyor of the food product but takes also care that the delivery opening is closed after use. A single movement of the endless screw enables the opening and the closure of the delivery opening and the dosage of the food product delivered. Since the closure of the delivery opening is operated by the endless screw, a deterioration of the food product, stored inside the food product cartridge, is avoided.

In a preferred embodiment, a food product cartridge has a handle connected to the endless screw, a cycle of the handle comprising the opening of the delivery opening followed by the closing of the delivery opening. Thus, the end of the cycle corresponds with the closure of the delivery opening. In this way, the delivery opening remains closed between two operations of food product delivering, preventing in such a manner the loss of food product. Also, one cycle of the handle corresponds to a dosage of food product, enabling the user to obtain the dosage of food product he wants by the simple operation of turning the handle.

Preferably, the handle is mounted on the axis of the endless screw and is located on a front end of the base part of the cartridge. The position of the handle thus provides a user friendly operation since its access is easy and its manipulation is simple.

In a preferred embodiment of the present invention, the handle is associated to a locking member provided to retain the handle and the shutter in the closed position of the delivery opening. The locking member determines in such a manner a cycle of the handle corresponding to one dosage of food product. When the delivery operation is finished, the handle is retained by the locking member in a position corresponding to the closed position of the shutter causing the shutter to remain tightly closed when no delivery of food is desired.

Preferably, in the cartridge according to the invention, a thread of the endless screw located at an extremity thereof forms the shutter of the delivery opening. The shutter is thus integrated into the endless screw which enables an easy and reliable construction.

Preferentially, in the food product cartridge of the present invention, the endless screw comprises at least two threads, the thread located at the extremity of the endless screw is substantially a circle segment-shaped and at least half of the thread has a surface extending perpendicular to the axis of the endless screw. This particular shape enables to define a larger space between the thread and the opening delivery, thus enabling to deliver a bigger dosage of food product and moreover, facilitating the flow of food product through the delivery opening by avoiding the possibility for small quantities of food product to remain blocked near the shutter. Furthermore, the threads of the endless-screw are preferentially disposed in the shape of a V with respect to the axis of the endless screw. This particular shape end disposition of the threads facilitate the removal of the endless screw from moulds after its fabrication.

The food product cartridge of the invention comprises an upper part and a base part connected to each other, the base part comprising a delivery and dosage member, an endless screw and a delivery opening, the endless screw being provided to operate a shutter for opening and closing the delivery opening. The fact that the delivery and dosage member are located in the base part of the cartridge facilitates the delivery of the food product by the gravitation movement of the food product.

The invention also relates to a food product cartridge, comprising a delivery and dosage member, preferentially provided to be used in a beverage dispenser. It can also be used in a food dispenser.

Preferentially, the beverage or food dispenser comprises a cartridge with a code indicating a type of food product stored in the cartridge and a reader provided to read the code, the reader being further provided to convert the read code into an operating signal indicating a number of rotations to be imposed on the endless screw, the reader being connected to a motor which is further connected to the endless screw, the motor having an input for receiving the operating signal.

With this embodiment of the invention, it is not necessary to move the handle manually in order to obtain the required dosage. The proper dosage will be delivered after the choice of the food product wanted by the user. The information about the appropriate dosage to be delivered is given by the code, one particular code, corresponding to one particular product food contained in a particular cartridge.

In this way, the dosage is delivered, with no other intervention of the user than choosing the beverage he waned by pushing one button.

The invention will be described and accompanying drawings illustrate an example of a preferred embodiment.

Figure 2:
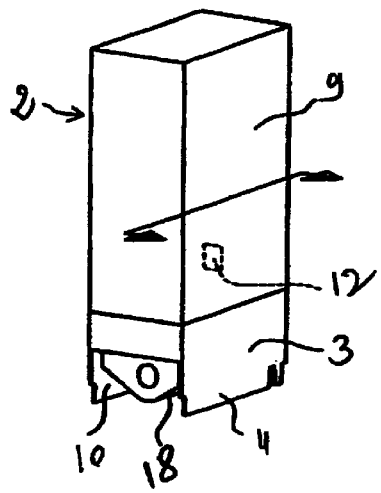
Figure 3:
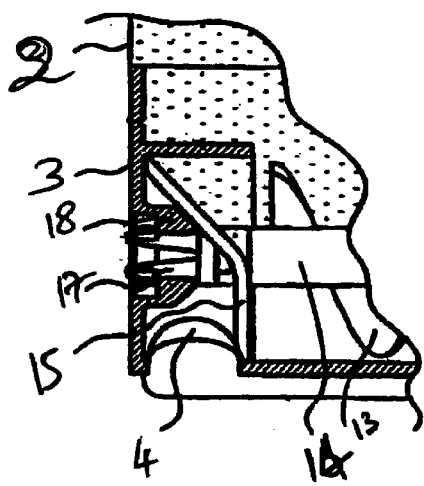
Figure 4:
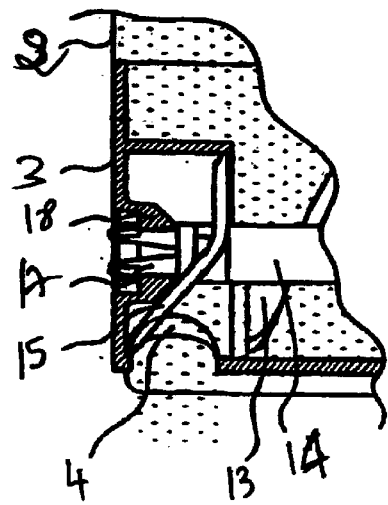

FIG. 1 is a schematic view of a beverage dispenser using the food product cartridge of the invention, FIG. 2 is a perspective view of a cartridge of the invention with the delivery opening in closed position, FIG. 3 is a section view of a preferred embodiment of the shape of the endless screw inside the base part of the cartridge with the delivery opening in closed position, FIG. 4 is a section view of a preferred embodiment of the shape of the endless screw inside the base part of the cartridge with the delivery opening in open position, FIG. 5 is a front view of the handle connected to the endless screw located in the base part of the cartridge of the invention, FIG. 6 is a detailed view of the locking member associated to the handle, viewed from the rear of the FIG. 7 is a section view of the cartridge showing another embodiment the endless screw, with the delivery opening in closed position, and FIG. 8 is a section view similar to FIG. 7, with the delivery opening in open position.

In the drawings a same reference sign has been assigned to a same or analogous element.

The example given in the following description concerns a beverage dispenser. Of course, solid food could also be stored in a food product cartridge according to the invention and delivered in a food dispenser.

FIG. 1 shows an example of beverage dispenser 1 provided to receive a cartridge 2 according to the invention. The cartridge is housed in the dispenser in order to have its base part 3 fitting inside the dispenser and having the delivery opening 4 situated above a first pipe leading the food product from the cartridge towards a bell-mouth 6. A second pipe 7 is provided to convey a liquid to be added to the food product in order to obtain a beverage. The second pipe 7 also ends at the bell-mouth 6 where the liquid and the food product are mixed and fall then into a receptacle 8 situated under the bell-mouth 6. The liquid for preparing a beverage is temporarily stored in a reservoir that can be heated by conventional heating means. If the dispenser 1 is provided for the preparation of cold beverages, beverage cooling means can also be provided.

This dispenser 1 is provided to receive food product cartridges, for example such as the one shown in FIG. 2. This cartridge 2 is of substantially parallelpipedic shape. They, housing comprises an upper part 9 and a base part 3 connected to each other. The upper part is made of a plastic-lined cardboard, but other materials such as plastic or metal could also be used. The base part 3 comprises two vertical lateral walls (10, 11) maintaining the upper 9 part in a vertical orientation when it is stored inside a beverage or food dispenser, or when the cartridge 2 is removed from the dispenser 1. The base part 3 has a shape that fits to the internal part of a dispenser 1 provided to receive the food product cartridge 2. The cartridge 2 shown in FIG. 2 comprises preferably a window 12 enabling to check easily the level of food product remaining in the cartridge.

In another embodiment of the present invention a code could be present on the cartridge. For example a first code assigned to coffee is present on the cartridge containing coffee. When reading this code with an appropriate reader which is provided to convert the code into an operating signal indicating the number of rotations to be imposed to the endless screw. The reader is connected to a motor which is further connected to the endless screw. The motor has an output for receiving the operating signal. Under control of the operating signal the motor will execute the number of rotations as indicated in the operating signal. In such a manner the correct dosage will be delivered.

FIG. 3 and FIG. 4 show one embodiment of the base part 3 of the cartridge 2 according to the invention. This embodiment is shown in closed position of the delivery opening 4 in FIG. 3 and in open position of the delivery opening 4 in FIG. 4.

These figures show that the base part 3 of the cartridge 2 comprises an endless screw 13. The axis 14 of the endless screw 13 extends substantially parallel to the bottom of the base part 3 where is situated the delivery opening 4 under an extremity of the endless screw 13. The thread situated at the extremity of the endless screw 13 is used as a shutter 15. This thread is circle segment-shaped and at least a half of the surface of the thread extends perpendicular to the axis 14 of the endless screw 13, the other half of the surface of the thread being inclined over an angle of approximately 45° relative to the axis 14 of the endless screw 13. This particular shape makes the thread a tight shutter 15. It also enables to obtain the opening of the delivery opening 4 by the movement of the endless screw 13. After opening, the further rotation of the endless screw 13 will shift the circle segment again before the opening thereby closing the latter.

These two operations occur within one single cycle of the endless screw 13 which is driven by the handle 16.

The threads of the endless screw 13 are preferentially disposed in the shape of a V with respect to the axis 14 of the endless screw 13. This particular shape and disposition of the threads facilitate the removal of the endless screw 13 from the mould after its fabrication.

The extremity of the endless screw 13 is fixed in a ratchet wheel 17 housed in a closed space 18 which is part of the base part 3. This closed space 18 has preferentially a curved bottom as shown in FIG. 2.

FIG. 5 shows a front view of the handle 16 mounted on the axis 14 of the endless screw 13 and located on a front end 19 of the base part 3. A detailed view of the handle 16 associated with a locking member 20 is shown in FIG. 6.

The handle 16 is retained in closed position by a locking member 20. The handle 16 and the locking member 20 comprises a male-female type mechanism. In the example shown in FIG. 5 and FIG. 6, a protrusion on the handle 16 being the male and a cavity which is located on the housing of the base part 3 being the female. Of course the positioning of the male and female member could be interchanged.

When the endless screw 13 performs a first half revolution corresponding to one half revolution of the handle 16, the thread constituting the shutter 15 rotates from the closed position shown in FIG. 3 to the open position shown in FIG. 4, allowing the conveyance of the food product stored in the cartridge 2 toward the delivery opening 4. The food product flows from the cartridge 2 through the open delivery opening 4 and then in a first pipe 5 towards the bell-mouth 6 provided to receive the food product and the liquid coming from the reservoir situated in the beverage dispenser 1 as it is shown in FIG. 1.

When the endless screw 13 performs the following half revolution corresponding to the following second half revolution of the handle 16, the flow of product occurs until the end of a revolution of the endless screw 13. Then, the endless screw 13 is back in the position shown in FIG. 3, thus closing the delivery opening 4 and stopping the flow of food product. When the cycle has ended, the food product has been delivered and then the delivery opening 4 is in closed position. It is thus possible to remove the food product cartridge 2 without any loss of food product.

FIG. 7 and FIG. 8 show another shape of the thread operating as a shutter 15 of the delivery opening 4 of the food product cartridge 2 of the invention.

In this embodiment, the endless screw 13 has circular threads. The thread at the extremity of the endless screw 13 which constitutes the shutter 15 has a conventional shape enabling the use of a conventional endless screw.

What is claimed is:

1. A food product cartridge comprising a delivery and dosage member, said cartridge having a base part wherein an endless screw and a delivery opening are housed, and wherein a thread of the endless screw located at an extremity thereof forms a shutter of the delivery opening, said shutter being operatively connected to said endless screw.

2. The cartridge according to claim 1, wherein a cycle of a handle connected to the endless screw allows the opening of the delivery opening followed by the closing of the delivery opening.

3. The cartridge according to claim 2, wherein the handle is mounted on an axis of the endless screw and is located on a front end of the base part.

4. The cartridge according to claim 2, wherein the handle is associated with a locking member provided to retain the handle and the shutter in a position closing the delivery opening.

5. The cartridge according to claim 1, wherein the endless screw comprises at least two threads, the thread located at an extremity of the endless screw being substantially circle segment-shaped and at least half of the thread having a surface extending perpendicular to the axis of the endless screw.

6. The cartridge according to claim 1, wherein the endless screw comprises threads disposed in the shape of a V with respect to the axis of the endless screw.

7. The cartridge according to claim 1, wherein the base part comprises an endless screw and a delivery opening, said endless screw being provided to operate the shutter for opening and closing the delivery opening.

* * * * *